Figure 1:
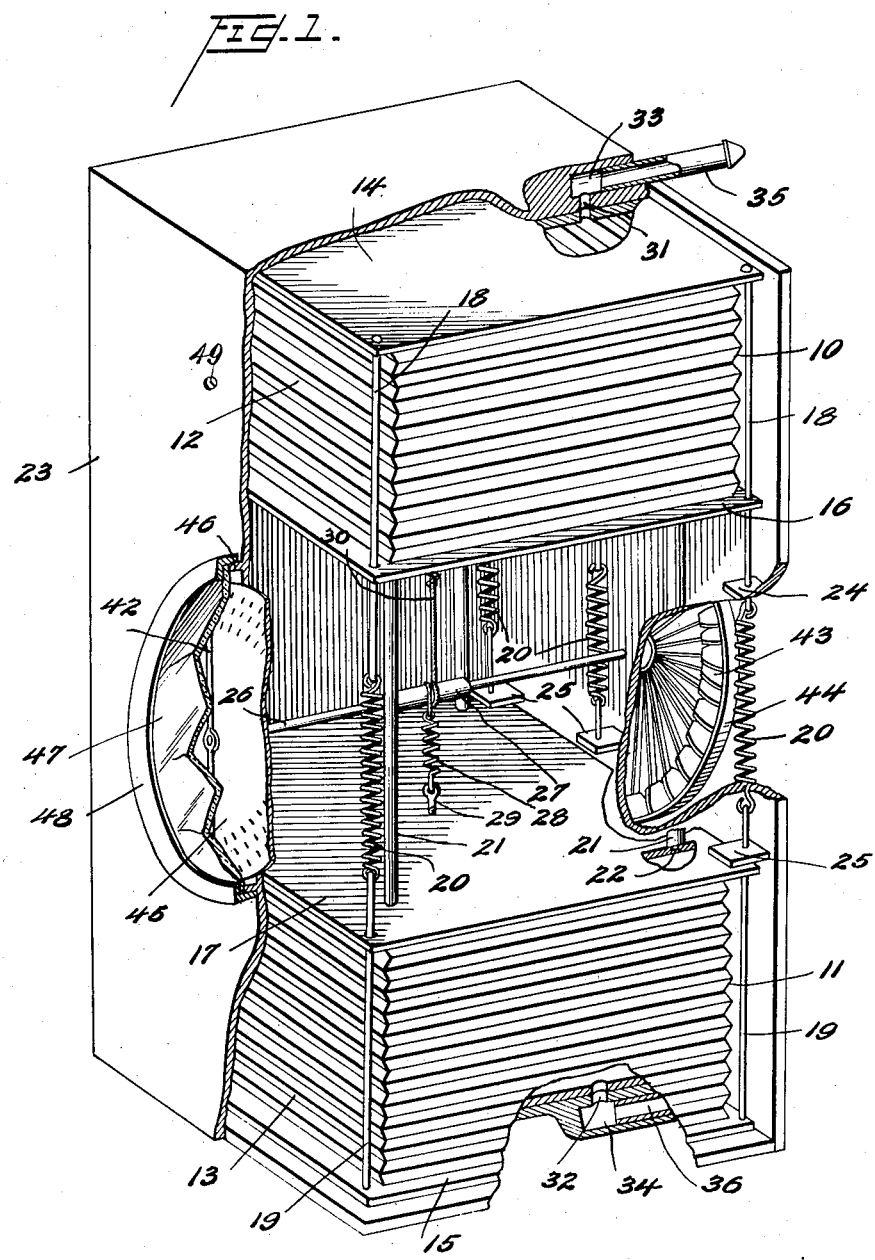

June 9, 1925.　　　　　　　　　　　　　　　1,541,412

G. DE BOTHEZAT ET AL

AIR SPEED METER

Filed March 9, 1922　　　2 Sheets-Sheet 1

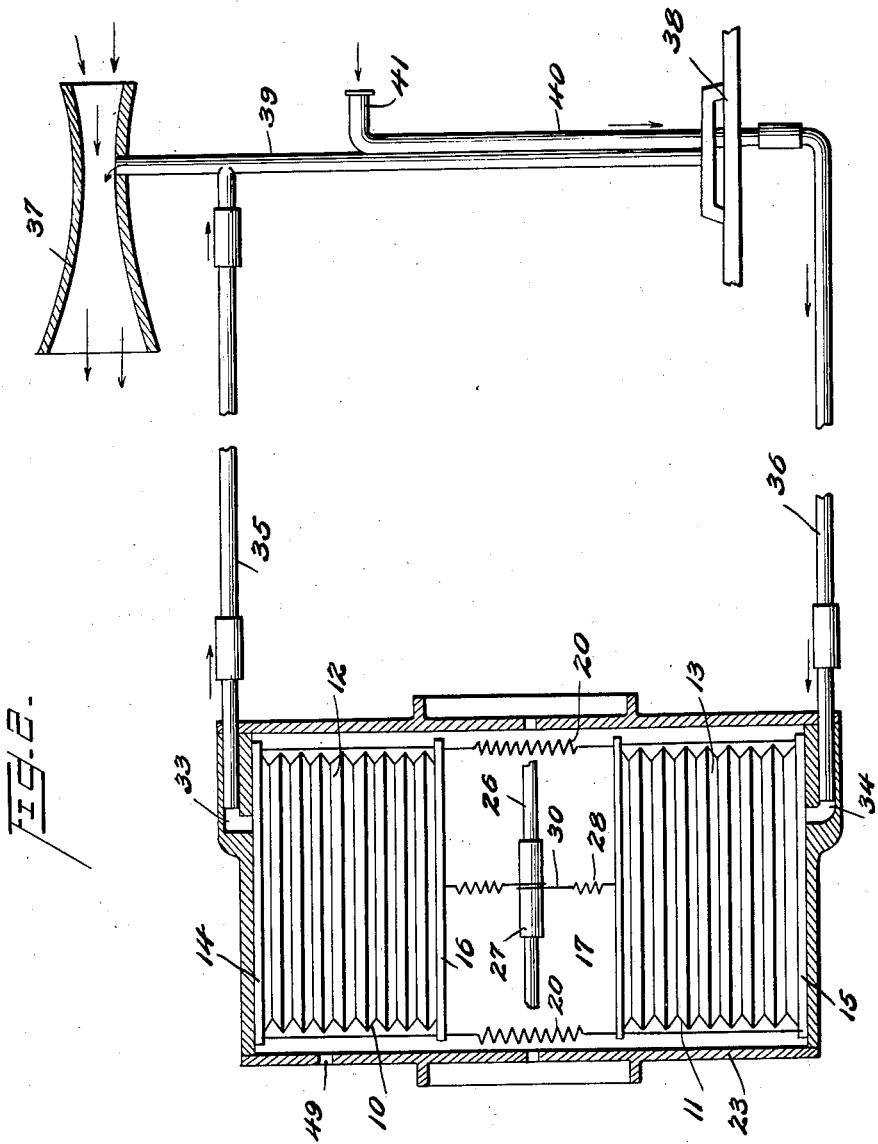

Patented June 9, 1925.

1,541,412

UNITED STATES PATENT OFFICE.

GEORGE DE BOTHEZAT AND IVAN I. EREMEEFF, OF DAYTON, OHIO.

AIR-SPEED METER.

Application filed March 9, 1922. Serial No. 542,518.

*To all whom it may concern:*

Be it known that we, GEORGE DE BOTHEZAT and IVAN I. EREMEEFF, citizens of Russia, residing at Dayton, in the county of Montgomery and State of Ohio, have invented certain new and useful Improvements in Air-Speed Meters, of which the following is a specification.

This invention relates to a speed meter adapted to indicate the speed of a moving body such as an airplane or automobile in relation to the surrounding air.

The primary object of the invention is to provide an instrument which will be very sensitive to slight changes in speed and afford accurate readings of the speed of the moving body. For this purpose the instrument includes elements expansible and contractible in unison in response to suction and pressure due to air velocity respectively, so that their combined efforts may be registered on a suitable indicating dial.

The invention is described in connection with the accompanying drawings, in which:

Figure 1 is a perspective view of an embodiment of my invention with certain parts broken away to show the structure more clearly; and Figure 2 is a side elevation with the casing and Venturi tube shown in section and certain parts removed.

The numerals 10 and 11 designate bellows having the contractible and expansible bodies 12, 13, each of which is attached at one end to fixed closure plates 14, 15 respectively, and at the other end to movable closure plates 16, 17. The fixed and movable plates are preferably of rectangular shape and vertically aligning holes are formed through the plates near the corners and middle of two opposite sides for receiving rods or wires 18, 19. The upper ends of wires 18 and lower ends of wires 19 are secured to the fixed plates 14 and 15 respectively while the lower ends of wires 18 and upper ends of wires 19 extend beyond the movable plates 16 and 17 and have their opposing hooked-shaped ends connected by tension coil springs 20. The springs maintain the wires 18, 19 tight so that they are not easily bent. These wires act as guides for the movable plates 16, 17. Posts 21 connect the movable plates together, the ends of the posts 21 being secured to the movable plates in any suitable manner as by means of rivets or screws 22, so that the two plates move in unison.

The bellows 10, 11 are enclosed in a casing 23 of wood or other suitable material and two opposite sides of this casing are provided with spaced, inwardly projecting lugs 24, 25 having apertures through which the wires 18 and 19 respectively extend. A cross shaft 26 extends through the space in the casing between the bellows and is journalled in opposite side walls of the casing for rotational movements. A sleeve 27, preferably of rubber is mounted at an intermediate portion of the shaft for rotation therewith. At about the center of each of the movable plates tension springs 28 are connected by means of eyebolts 29 secured respectively to said plates. A flexible element 30 is wound several times around the sleeve 27 and has its opposite ends connected to the free ends of the corresponding springs 28. The fixed plates of the bellows and top and bottom plates of the casing 23 are provided with registering apertures forming vents 31, 32 which communicate respectively with passages 33, 34 having tubes 35, 36 inserted therein.

The tube 35 connects through suitable tubing to the throat of a venturi 37 which is supported on an aerofoil by a post or strut 39 so that air passes through the venturi in the direction indicated by the arrows. The tube 36, on the other hand, is connected to a tube 40 having its end 41 bent so as to expose the open end to the air in the direction of the flight of the airplane or other moving body.

The shaft 26 projects slightly beyond the side walls of casing 10 and has secured to one end an indicating hand 42 and to the other end a paddle wheel 43 movable in a closed housing 44 which contains a liquid adapted, in conjunction with the blades of the paddle wheel, to dampen the oscillatory movements of the shaft. A dial 45, preferably having rows of graduations arranged spirally, is attached to one face of the casing 23 about the shaft 26 and within an annular flange 46. A crystal 47 covers the dial and indicator hand 42, being secured in place by a bezel 48 which engages said annular flange.

Assuming that the instrument is mounted on a moving airplane, the air rushing through the venturi 37 produces a suction at the throat thereof which is communicated to the interior of bellows 10. As the interior of the casing 23 is open to the atmosphere through an aperture 49, the suction produced in the bellows 10 tends to raise the movable plate 16. At the same time air impinging upon the exposed end 41 of tube 36 also tends to lift the movable plate 17. The motion resulting from the combined actions of plates 16 and 17 is communicated to shaft 26 through springs 28 and the flexible element 30.

Motion of the shaft 26 is communicated to indicator hand 42 which points to a reading on the dial. The first revolution of the shaft corresponds to readings on the inner row, the second revolution to reading on the second circle and so on. Differences in speed between adjacent readings of inner and outer circles of the spiral are large so that the proper dial reading can be readily ascertained. Owing to the use of the combined effect of suction and impact due to the relative velocity of the air, the instrument is very quick to respond to changes in speed. The damping device prevents lengthy oscillations of the indicator hand so that when the speed is momentarily constant an accurate reading can be obtained. Lugs 25 act as stops for the movable plates toward high speed position and lugs 24 function as stops for the low speed position of the indicator hand.

We claim:

1. In an air speed meter, the combination with bellows arranged in spaced relation, said bellows having movable closure plates, of means rigidly connecting said plates for movement in unison, wires for guiding each of said plates, springs connecting the opposing ends of said wires, means influenced by air velocity connected to each of said bellows, an indicating device, and mechanism for communicating the resultant motion of said plates to the indicating device.

2. In an air speed meter, the combination with bellows arranged in spaced relation, said bellows having movable closure plates, of means rigidly connecting said plates for movement in unison, guides for directing the movements of said plates, means influenced by air velocity connected to each of said bellows, an indicating device, and mechanism for communicating the resultant motion of said plates to the indicating device including a rotatable shaft, a flexible element wound on said shaft and resilient means connecting opposite ends of said flexible element to said plates.

3. In an air speed meter, the combination with bellows arranged in spaced relation, said bellows having movable closure plates, of means rigidly connecting said movable plates, guides for directing the movements of said plates, means influenced by air velocity connected to each of said bellows, stops for limiting the movements of said plates, an indicating device, and mechanism for communicating the resultant motion of said plates to the indicating device.

In testimony whereof we affix our signatures.

Dr. G. de BOTHEZAT.
IVAN EREMEEFF.